United States Patent [19]
Spisak

[11] 3,823,982
[45] July 16, 1974

[54] HUB CAP FOR MOLDED VEHICLE WHEEL
[75] Inventor: Edward G. Spisak, Westland, Mich.
[73] Assignee: S & S Product Engineering Service, Inc., Wyandotte, Mich.
[22] Filed: Aug. 2, 1973
[21] Appl. No.: 386,447

[52] U.S. Cl............. 301/37 P, 301/37 R, 307/37 C
[51] Int. Cl............................ B60b 7/04, B60b 7/06
[58] Field of Search.. 301/37 R, 37 P, 37 C, 37 CD, 301/37 T, 37 TP, 37 PB, 63 R, 108 A, 108 R

[56] References Cited
UNITED STATES PATENTS

| | | | |
|---|---|---|---|
| 2,239,366 | 4/1941 | Lyon | 301/37 C |
| 2,368,242 | 1/1945 | Lyon | 301/37 R |
| 2,431,338 | 11/1947 | Lyon | 301/37 R |
| 3,669,501 | 6/1972 | Derleth | 301/37 P |
| 3,756,658 | 9/1973 | Adams | 301/37 R |

Primary Examiner—Robert S. Ward, Jr.
Assistant Examiner—Victor N. Sakran
Attorney, Agent, or Firm—Fisher, Krass, Young & Gerhardt

[57] ABSTRACT

A wheel and cap combination has a metal tire rim and metal wheel disc having wheel attaching holes. An ornamental plastic cover is molded or bonded to the rim and disc radially outward of the holes. The plastic cover has a groove that receives spaced peripheral ribs formed on the annular flange of a cap that extends into the plastic cover. A boss formed on the plastic cover is located between the edges of a cutaway section of the annular flange to prevent relative rotation.

4 Claims, 5 Drawing Figures

PATENTED JUL 16 1974 3,823,982
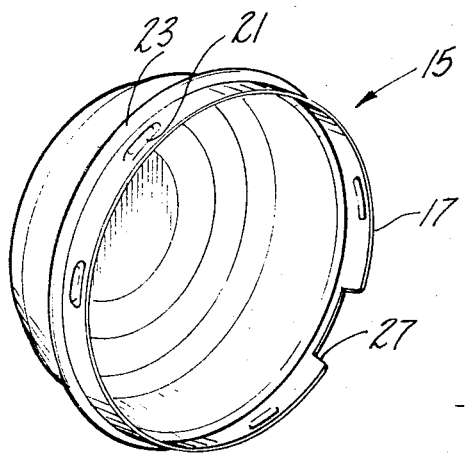
Fig-1
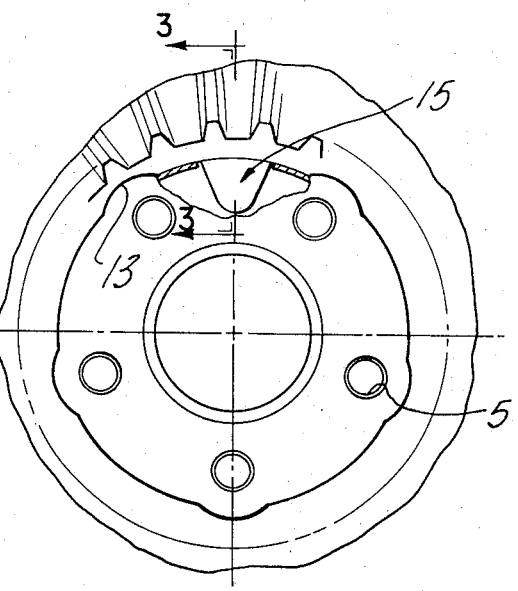
Fig-2
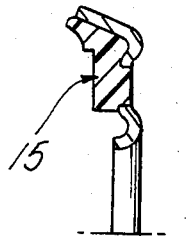
Fig-3
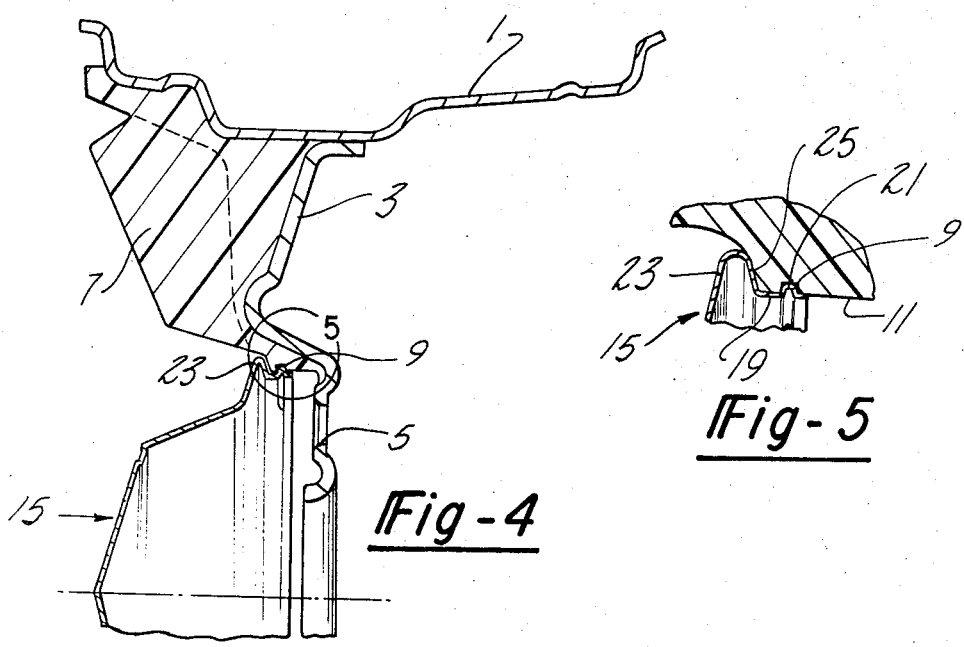
Fig-4
Fig-5

HUB CAP FOR MOLDED VEHICLE WHEEL

This invention relates to vehicle wheels and more particularly to a wheel and hub cap combination.

In order to simulate cast metal wheels or otherwise provide an ornamental and pleasing appearance to vehicle wheels there have been produced wheels having a conventional combined steel rim and disc with a plastic cover molded directly on or otherwise bonded to the steel rim and disc. In order to provide a suitable attaching point for a hub cap serving to cover the axle end such wheels have utilized an axially extending annular metal member extending from and attached to the disc for receiving studs or bolts. The cap is then attached to the axially extending member. This construction requires that the plastic cover extends sufficiently to cover the metal extension. In such a construction the bolts or nuts are necessarily exposed and in order to present an attractive appearance must be plated or otherwise coated. This construction is expensive since it utilizes extra plastic material and requires the expensive nuts or bolts.

It would be desirable to provide a wheel assembly utilizing a plastic covered rim and disc assembly wherein hub cap or cover can be attached to the plastic portion outside of the wheel attaching nuts or bolts providing a simpler less expensive and yet attractive construction.

In order to provide such a construction it is necessary that the hub cap be easily attached to the plastic cover in a manner to retard unintentional removal due to shock or spinning off.

It is therefore an object of the invention to provide a plastic covered wheel and hub cap combination wherein the cap is attached directly to the plastic wheel.

This and other objects and advantages will be readily apparent from the following description and accompanying drawing in which:

FIG. 1 is a perspective view of the metal cap used in the invention;

FIG. 2 is a plan view, with parts broken away, of the wheel structure;

FIG. 3 is a section view taken on the line 3—3 of FIG. 2;

FIG. 4 is a sectional view of a portion of the wheel with the cap in place; and

FIG. 5 is an enlarged section view of the portion of FIG. 4 within the circle 5.

Referring now to the Figures it will be seen that the wheel assembly includes a metal tire receiving rim 1 attached to a metal disc 3 having a plurality of bolt receiving holes 5 through which studs or bolts could extend to secure the wheel to the hub in conventional manner. In order to provide a low cost wheel having an attractive appearance including the simulation of mere expensive cost wheels, the wheel has a plastic portion 7 molded or otherwise bonded to the rim 1 and disc 3. The plastic portion, which may be of any suitable material such as polyurethane conceals the rim and disc from view.

In order to provide for direct attachment of a cap to the plastic and thus eliminate the need for special attaching structures in turn attached to the disc 3, and to provide for concealment of bolts or nuts, an annular groove 9 is formed in the inner surface 11 forming the inner diameter of the plastic portion 7. The plastic portion has relieved portions 13 formed in the inner diameter so as to provide clearance for a tool such as a wrench used to tighten or loosen nuts or bolts. As seen in FIGS. 2 and 3 a single boss 15 is molded in the plastic cover 7, the purpose of which will be described below.

As seen in FIG. 1, the cap or cover, generally indicated 15, is a cap shaped, stamped or otherwise formed, member having an outer flange 17 including an annular portion 19 having an outer diameter slightly smaller than the inner diameter of 11 of the plastic portion 7. The annular surface 19 is interrupted by circumferentially spaced raised ribs 21 proportioned and located to fit in the groove 9. Because of the rather resilient nature of the polyurethane member 7, the cap 15 can be inserted into the wheel with the ribs 21 snapping into place in the grooves 9.

The cap or cover 15 has a curved flange 23 which forms the greatest diameter of the cap and which has a radial face or surface 25 that engages a similar surface on the plastic cover 7.

In order that the ribs 21 do not align with the tool relief portions 13 and thus not properly engage the groove 9 the cap 15 is formed with a cut-away slot 27 that provides for clearing the forementioned boss portion 15. The edges of the slot 27 and boss 15 cooperate to prevent relative rotation of the cap and wheel. Such rotation could permit the cap to spin off or rotate to a position where the ribs 21 would be aligned with the tool relief portions 13 and permit the cap to fall off.

It will be seen that the invention provides a simple yet efficient means of providing a wheel and cap combination which is easy to manufacture and assemble.

I claim:

1. A wheel and cap combination including a metal tire receiving rim, a metal wheel disc having wheel mounting holes and a plastic covering portion attached to the rim and disc portions and covering the latter radially outward of said holes, said plastic portion having annular inner diameter surface, an annular groove in said inner diameter surface and a cap attached to the plastic portion, said cap having an annular portion axially extending inside of said inner diameter surface and having a plurality of circumferentially spaced ribs formed on the annular portion and located in said groove and retarding removal of the cap from the wheel assembly, and cooperating means carried by said plastic portion and said cap preventing relative rotation between the plastic portion and cap.

2. The wheel and cap combination of claim 1, wherein said plastic portion has an outwardly facing surface extending radially outward from the outer edge of said inner diameter surface and wherein said cap has an annular flange portion spaced outwardly from the ribs and contacting said outwardly facing surface on said plastic cover portion.

3. The wheel and cap combination of claim 2 wherein said annular inner diameter surface is broken by a series of reliefs corresponding to the wheel mounting holes to provide clearance for a tool used to tighten and loosen wheel fastener means extending through said holes and wherein said ribs are circumferentially located between said reliefs.

4. The wheel and cap combination of claim 1 wherein said cooperating means comprises a radially extending boss formed in the plastic cover and a cut-away opening in the annular portion on said cap, the edges of said opening engaging the boss to rotationally locate the wheel and cap.

* * * * *